United States Patent [19]

Neumann

[11] 4,395,833

[45] Aug. 2, 1983

[54] SEALING AND LUBRICATING SYSTEM FOR A DREDGE

[75] Inventor: John A. Neumann, Currumbin, Australia

[73] Assignee: Neumann Equipment Marketing Co. Pty. Ltd., Currumbin, Australia

[21] Appl. No.: 299,062

[22] Filed: Sep. 3, 1981

[30] Foreign Application Priority Data

Sep. 9, 1980 [AU] Australia ............................... PE5481

[51] Int. Cl.³ ............................................... E02F 3/88
[52] U.S. Cl. ........................................... 37/66; 277/3; 60/456
[58] Field of Search .......................... 277/3; 37/64–67, 37/73; 60/456, DIG. 3

[56] References Cited

U.S. PATENT DOCUMENTS

| | | | |
|---|---|---|---|
| 2,232,620 | 2/1941 | Meeks | 60/DIG. 3 |
| 2,482,249 | 9/1949 | Court | 60/DIG. 3 |
| 3,476,498 | 11/1969 | Von Bolhar | 37/66 X |
| 4,316,336 | 2/1982 | Salemink | 277/3 X |
| 4,321,793 | 3/1982 | Uranaka et al. | 60/DIG. 3 |

Primary Examiner—Clifford D. Crowder
Attorney, Agent, or Firm—Schwartz, Jeffery, Schwaab, Mack, Blumenthal & Koch

[57] ABSTRACT

The dredge is of the type having a bucket wheel, driven by a hydraulic motor through a gearbox, on the front of a bucket wheel carrier hinged at its rear to the dredge hull, and lowered to or raised from working depth by a cable engaged with a lifting sheave block near the front of the carrier, the dredge being slewed by cables from anchors to both sides of the dredge and engaged with slewing sheave blocks near the front of the bucket wheel carrier. Hydraulic fluid is bled from the motor to the gearbox, and then by a bleed line connected to the bearings of the sheaves of the lifting sheave block and the slewing sheave blocks. A check valve maintains a predetermined pressure in the bleed line to apply internal pressure to the seals of the gearbox, the lifting sheave block and the slewing sheave blocks.

6 Claims, 6 Drawing Figures

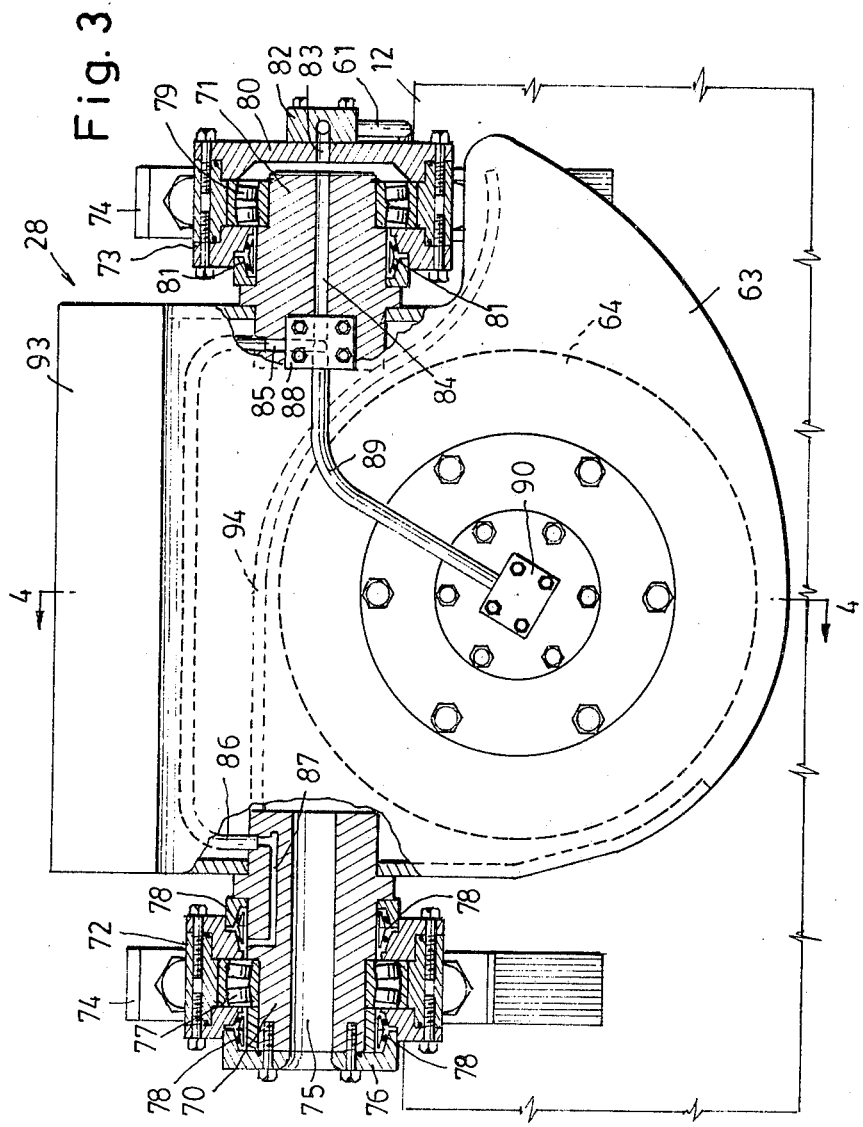

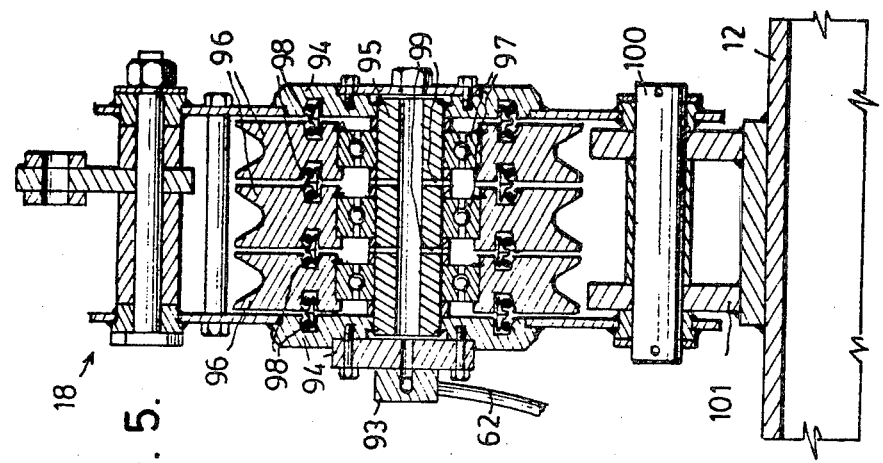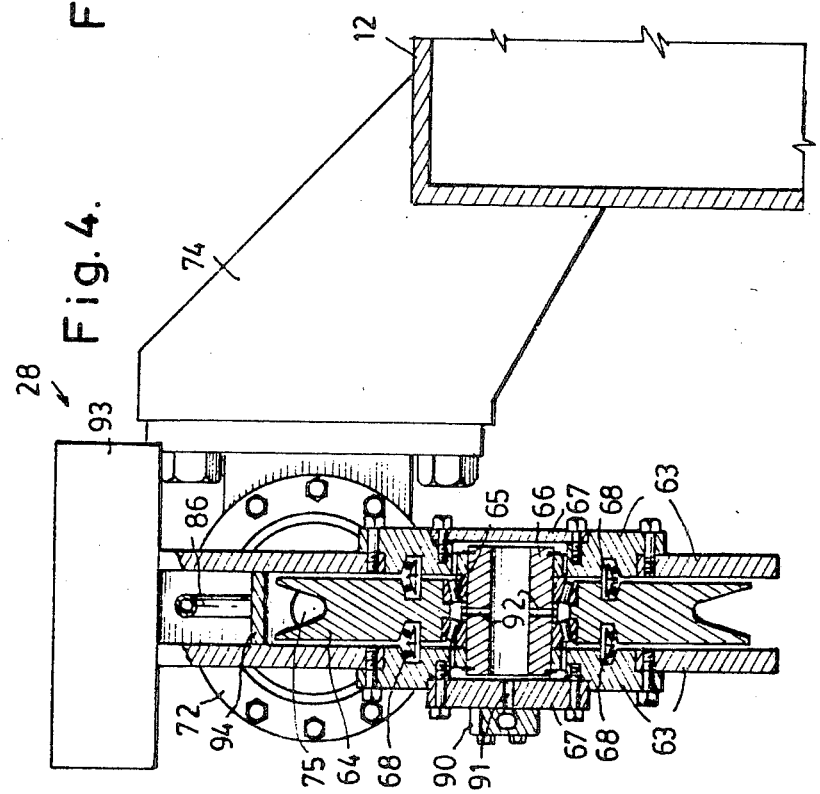

SEALING AND LUBRICATING SYSTEM FOR A DREDGE

BACKGROUND OF THE INVENTION

1. Field of the Invention

This invention relates to improvements in dredges.

2. Description of the Prior Art

A well-known type of dredge has a hull with a main section from which two parallel arms extend forwards, a bucket-wheel carrier, having a driven rotary bucket wheel at its front, being located between these arms and hinged at its rear so it can be lowered to working depth, or raised, by means of a cable passed through a sheave block on a gantry straddling the two forwardly extending arms and a further sheave block on the front of the bucket wheel carrier. At the stern of the dredge are two vertically slidable spuds, each of which can be released to drop and drive into the sea bed, one of these spuds being mounted in a carriage longitudinally slidable on the hull, and when this spud has been driven into the sea bed the dredge may be advanced relative to this spud and its carriage, the second spud then being released and driven into the sea bed, after which the first spud is raised and its carriage is returned forwardly on the hull. The spud which at any time is driven into the sea bed serves as a pivot about which the dredge and its bucket wheel can be slewed. For slewing the dredge, a pair of anchors are dropped to both sides of the front of the dredge, the anchors being lowered from booms on the dredge, cables from the anchors being carried through slewing sheave blocks on the front of the bucket wheel section, one of these cables being tensioned as the other is slackened to slew the dredge.

The bucket wheel is driven, through a gearbox, by a hydraulic motor at the front of the bucket wheel section, the hydraulic motor being operated by an engine-driven hydraulic pump on the dredge. The material being dredged is pumped through a conduit carried along the bucket wheel carrier and to the stern of the dredge, from which it is conveyed to the shore by a pontoon-supported conduit.

Although a dredge commonly works at fairly shallow depths, there are many occasions when dredging at greater depths is required. When the bucket wheel carrier is lowered for dredging at these greater depths, there is a likelihood of the failure, after a fairly short time, of the seals at the bucket wheel assembly and of the seals of the submerged sheave blocks of the bucket wheel carrier, that is to say the sheave blocks of the lifting cable and sheave blocks of the slewing cables. Any such failure is likely to result in very costly delays in the operation of the dredge, and the laborious and expensive replacement of the affected apparatus, which may be extensively damaged by the ingress of the highly abrasive material which is suspended in high concentration in the water during the dredging operations.

The present invention has been devised with the general object of providing simple yet effective means for very greatly reducing the likelihood of such seal failures occurring.

BRIEF SUMMARY OF THE INVENTION

A dredge according to the invention is of the type having a bucket wheel carrier which is hinged at its rear to the dredge hull and having at its front an assembly of a hydraulic motor driving a rotary bucket wheel through a gearbox provided with seals to prevent ingress of water, the bucket wheel carrier also having at or near to its front a lifting sheave block for a lifting cable by which the bucket wheel may be lowered to or raised from working depth, and slewing sheave blocks for cables by which the dredge may be slewed, each of the said sheave blocks containing at least one sheave rotatable on bearings and seals for preventing ingress of water to the bearings. Hydraulic fluid under pressure is bled from the motor to the gearbox and a bleed line for the fluid leads from the gearbox, to the tank of the hydraulic system. Fluid lines tapped into the bleed line lead to the bearings of the lifting sheave block and of the slewing sheave blocks, and an adjustable check valve maintains hydraulic pressure within the bleed line, within the gearbox and within the sheave blocks to apply internal pressure to the seals thereof to counter external pressure from the water in which these parts are submerged as well as for lubrication purposes.

BRIEF DESCRIPTION OF THE DRAWINGS

A preferred embodiment of the invention is shown in the accompanying drawings, wherein:

FIG. 3 is a partly sectioned side elevational view of a slewing sheave block of the dredge, FIG. 4 is a sectional view along line 4—4 in FIG. 3, FIG. 5 is a sectional view of the bucket wheel lifting cable sheave block of the dredge, and FIG. 6 is a diagram of the hydraulic circuit of the invention.

DETAILED DESCRIPTION OF THE PREFERRED EMBODIMENT

Figure 1:
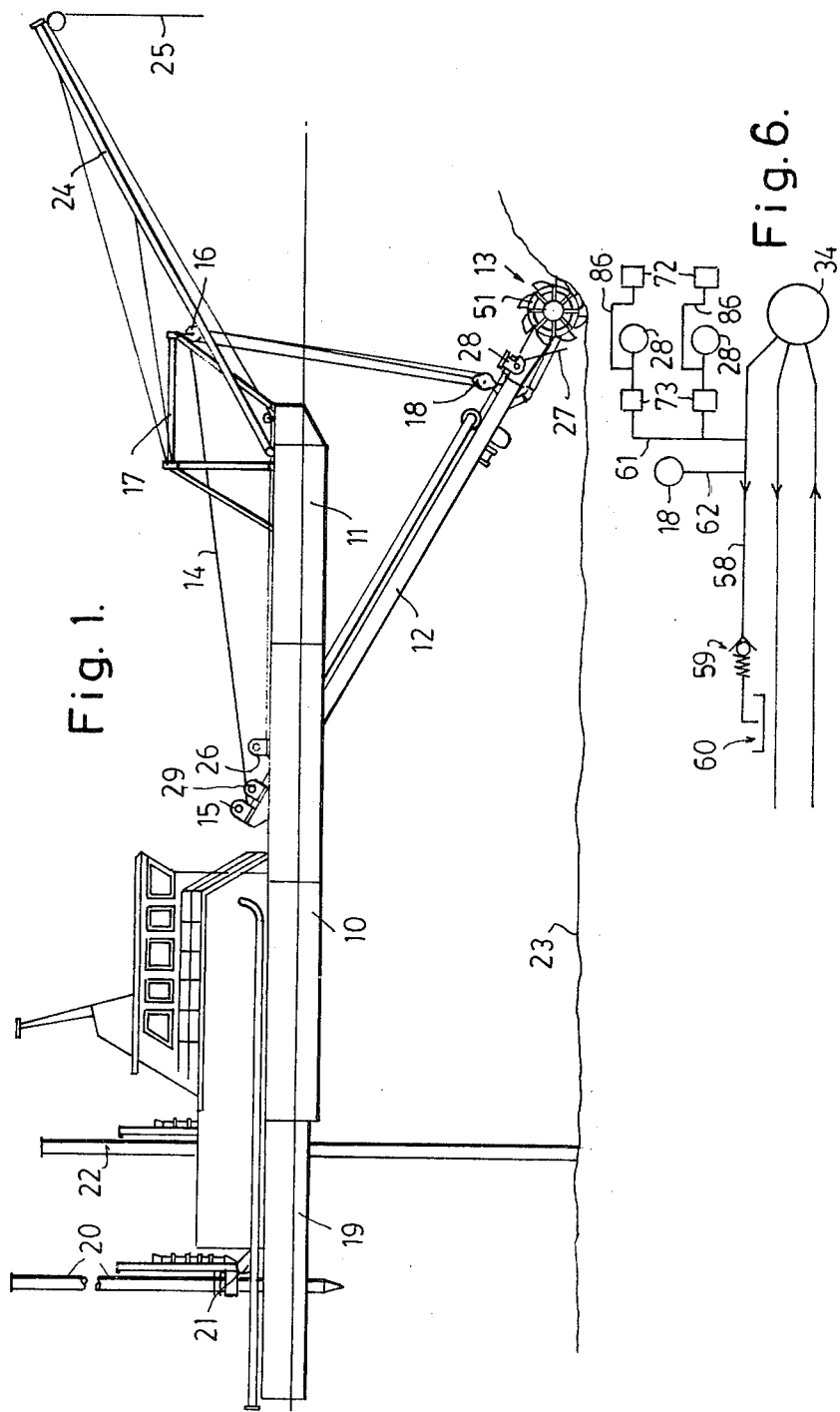
FIG. 1 is a side view of a dredge of the general type above described.
Figure 2:
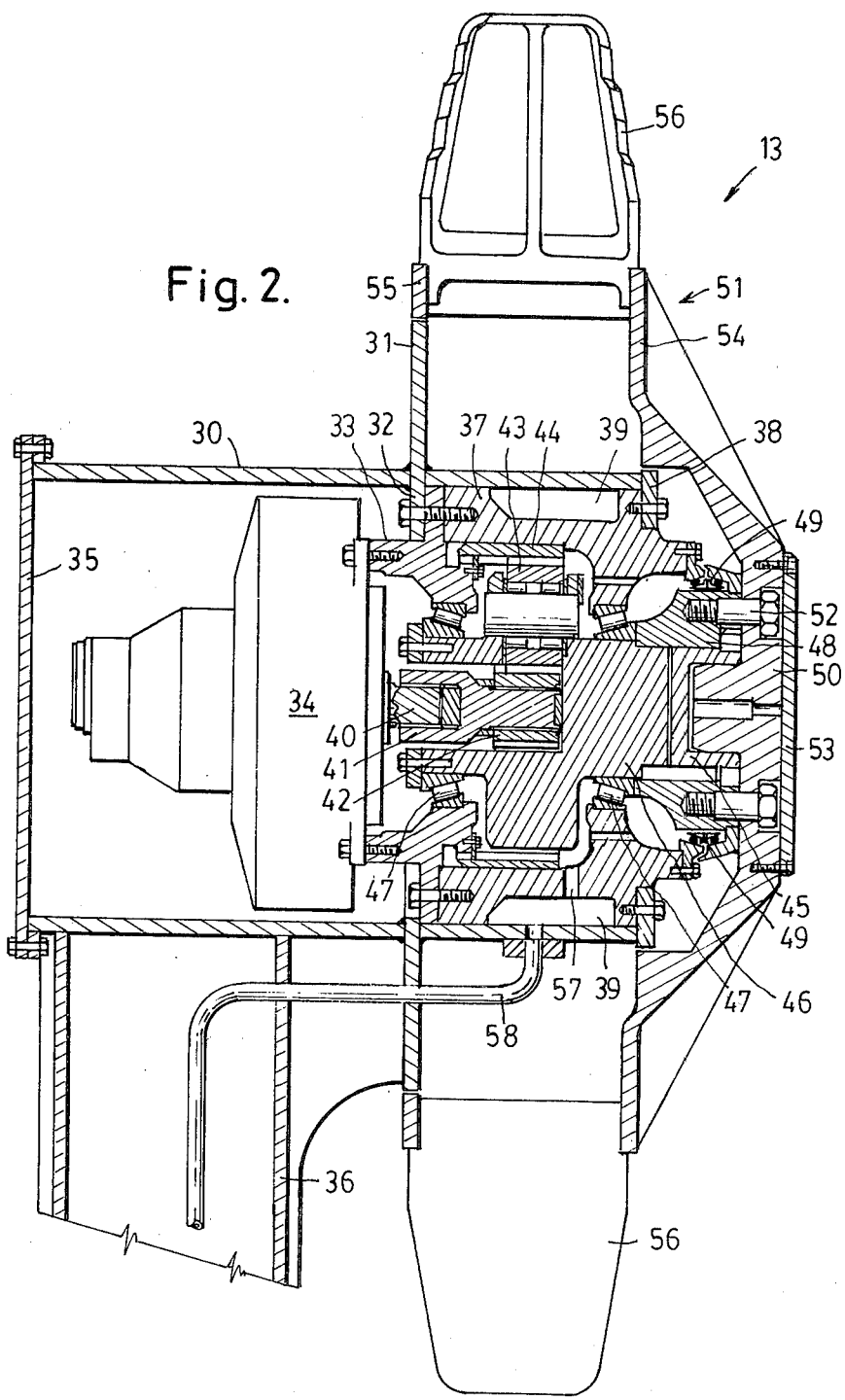
FIG. 2 is a sectional view of the bucket wheel assembly of the dredge.

The hull 10 of the dredge shown in FIG. 1 includes a pair of parallel spaced forwardly extending arms 11 between which a bucket wheel carrier 12 is mounted, hinged at its rear and with a bucket wheel assembly 13 at its front. The bucket wheel carrier 12 is supported by a cable 14 from a winch 15 and engaged with the sheaves of a gantry sheave block 16, carried by a gantry assembly 17 straddling the forward arms 11, and the sheaves of a sheave block 18 secured to the front part of the bucket wheel carrier 12.

The hull 10 has a rear section 19 formed with a central longitudinal division through which passes a spud 20 vertically slidably mounted on a carriage 21 which can be hydraulically advanced or retracted relative to the rear section 19. A second spud 22 is also vertically slidably mounted on the hull 10. Each spud can be lifted clear of the sea bed 23, and released to drive into the sea bed, and when the spud 20 is so driven, and the spud 22 is raised, the dredge can be advanced relative to the driven spud and its carriage 21. Either spud, driven into the sea bed, serves as a pivot about which the dredge can be slewed. To slew the dredge, anchors (not shown) are dropped from a pair of booms 24, suspended by cables 25 from a pair of winches 26; and cables 27 from the two anchors are carried through the sheaves of slewing sheave blocks 28 on opposite sides of the front part of the bucket wheel carrier 12 to a pair of winches 29.

The bucket wheel assembly 13 includes a main housing 30 consisting mainly of two cylindrical parts or like diameter but different axial length, secured coaxially to opposite sides of an annular plate, which thus forms an external bucket wheel support flange 31, and an internal mounting flange 32 to which is secured a motor mounting ring 33 on which, within the longer cylindrical section, a hydraulic motor 34 is mounted, this part of the main housing being closed by a cover plate 35. Welded to the main housing is a carrier bracket 36 connecting the assembly to the bucket wheel carrier 12.

In the shorter section of the main housing 30 a gearbox housing 37 is bolted to the motor mounting ring 33, an end ring 38 on the outer end of the gearbox housing 37 being sealed against the end of the main housing 30. An annular recess about the gearbox housing defines an annular chamber 39 about the gearbox and within the main housing.

Within the gearbox is a planetary gear assembly, the drive shaft 40 of the motor 34 being coupled by a drive spline 41 to the sun gear 42 of the assembly, a planet gear 43, meshing with the sun gear 42 and with a ring gear 44 fixed in the gearbox, being mounted on a planet carrier 45 having an integral shaft 46 rotatable in roller bearings 47 within the gearbox. Keyed onto the end of the planet carrier shaft is a wheel drive flange 48, and an annular seal assembly 49 is secured between the wheel drive flange and the outer end of the gearbox housing 37. This seal assembly of known type, will resist a considerable fluid pressure either external or internal.

The hub 50 of a bucket wheel 51 is secured to the wheel drive flange by bolts 52 the heads of which are covered by a circular cover plate 53. The wheel hub 50 is frusto-conical, enlarged in diameter to a flat annulus 54 fitting closely about the end ring 38 of the main housing 30. Welded between this annulus and a further annulus 55 of similar external diameter, but greater internal diameter, fitting closely about the bucket wheel support flange 31 of the main housing 30, are a series of dredge buckets 56.

The customary hydraulic fluid bleed line from the motor 34 is omitted, and no seal is provided about the drive shaft 40 of the motor. Consequently hydraulic fluid from the motor will bleed into the gearbox, serving to lubricate the gears. A bleed aperture 57 is formed through the wall of the gearbox housing into the surrounding annular chamber 39, and thence a bleed line 58 is carried through the carrier bracket 36 and along the bucket wheel carrier 12 and, by way of an adjustable check valve 59, to the tank 60 of the hydraulic system. The check valve 59 is adjusted to maintain a predetermined pressure of hydraulic fluid in the bleed line 58 and within the bucket wheel assembly 12.

Tapped into the bleed line 58 are two fluid lines, the first fluid line 61 leading to the slewing sheave blocks 28, the second fluid line 62 including a flexible part leading to the lifting sheave block 18.

Each of the slewing sheave blocks (FIGS. 3 and 4) has a pair of side plates 63 between which a sheave 64 is rotatable on roller bearings 65 about a tubular shaft 66, the ends of which are secured in circular openings in the side plates 63 and covered by cover plates 67. Annular seal assemblies 68 are housed in registering annular grooves formed in the sides of the sheave 64 and in the inside faces of the side plates 63.

The sheave block is pivotally mounted on the bucket wheel carrier 12, being provided with trunnions 70 and 71 rotatably in bearing blocks 72 and 73 respectively bolted to brackets 74 on the carrier 12. The trunnion 70, which is formed with an axial cable passage 75 and has a correspondingly apertured end piece 76 fixed to its outer end, is rotatable in roller bearings 77 in the bearing block 72, annular seal assemblies 78 being installed to both sides of the bearings. The trunnion 72 is rotatable in roller bearings 79 in the bearing block 73, the outer end of which is closed by a cover plate 80, and a single annular seal assembly 81 is installed to the inner side of the bearings.

The fluid line 61 is divided to lead to both slewing sheave blocks 28, in each case entering a junction piece 82 on the cover plate 80 of the bearing block 73 to communicate with a passage 83 through the cover plate so that hydraulic fluid under pressure will lubricate the bearings 79 to pressurise the seal assembly 81. An axial passage 84 through the trunnion 71 leads by way of a radial passage 85 to a conduit 86 which is carried to a fluid passage 87 in the trunnion 70, leading to the inner seal assembly 78 and thence to the bearings 77 and the outer seal assembly 78.

The axial passage 84 through the trunnion 71 also communicates, by way of a junction piece 88 on the outside of the outer side plate 63 of the slewing sheave block, with a conduit 89 leading to a further junction piece 90 on the outer cover plate 67 which is apertured at 91 to convey fluid under pressure into the tubular shaft 66, by way of radial passages 92 in this shaft to the roller bearings 65 and thence to the annular seal assemblies 68.

The fluid line 62 is connected into a junction piece 93 on one of the side plates 94 and the lifting sheave block 18. A tubular shaft 95 mounted between these side plates carries sheaves 96 rotatable on ball bearings 97. Seal assemblies 98 are housed in registering annular grooves in the adjacent faces of succeeding sheaves, and in the outside faces of the outer sheaves and in the side plates 94. Hydraulic fluid under pressure is conveyed from the tubular shaft 95 through radial passages 99 therein to the ball bearings 97 and to the seal assemblies 98 which are pressurized thereby. The sheave block 18 is pivoted by a pin 100 to a clevis 101 fixed on the bucket wheel carrier 12, and the fluid line 62 therefore is flexible or includes a flexible section.

The fluid pressure maintained within the seals of the bucket wheel assembly 13, the lifting sheave block 12, the slewing sheave blocks 28 and their bearing blocks 70 and 71 is such that the pressure differential across the seals, even when the dredge is working at maximum depth, will be well within safe limits. In practice, a fluid pressure of about 15 p.s.i. has been found to be satisfactory for two way seals which withstand external pressures up to about 28 p.s.i.

In the unlikely event that a seal should nevertheless fail, the feedback of hydraulic fluid from the bleed line 58 will diminish or cease, and an appropriate sensor at the tank 60 may be provided to give immediate warning, so that the dredging operations can be stopped immediately and the bucket wheel carrier 12 raised, to prevent damage occurring from the seal failure.

I claim:

1. A dredge of the type having a bucket wheel carrier hinged at its rear and having at its front a hydraulic motor driving a rotary bucket wheel through a gearbox with seals to prevent ingress of water, the bucket wheel carrier also having at or near to its front a lifting sheave block for a lifting cable by which the bucket wheel may be lowered to or raised from working depth, and slewing sheave blocks for cables by which the dredge may be slewed, each of the said sheave blocks containing at least one sheave rotatable on bearings and seals for preventing ingress of water to the bearings, wherein:
- a way for hydraulic fluid under pressure leads from said motor to said gearbox said way being disposed within a housing enclosing said motor and said gearbox, an annular chamber is formed around said gearbox, and a passage leads from the interior of said gearbox to said annular chamber,
- a hydraulic fluid bleed line leads from said annular chamber of said gearbox,
- a conduit connects said bleed line to said lifting sheave block bearings,
- a conduit connects said bleed line to said slewing sheave block bearings wherein each slewing sleeve block has trunnions rotatable in trunnion bearings in bearing blocks on the bucket wheel carrier,
- annular seals in said bearing blocks are adapted to prevent ingress of water to said trunnion bearings,
- said conduit from said bleed line to said slewing sheave block bearings leads also to said trunnion bearings, and
- means are provided for maintaining within the bleed line a predetermined hydraulic pressure adapted to apply internal pressure on said gearbox seals and said lifting and slewing sheave block seals.

2. A dredge according to claim 1 wherein:
- said way for hydraulic fluid from said motor to said gearbox is within a housing enclosing said motor and gearbox,
- an annular chamber is formed about said gearbox within said housing,
- a passage leads from the interior of said gearbox to said annular chamber, and
- said bleed line leads from said annular chamber.

3. A dredge according to claim 1 wherein:
- each slewing sheave block has trunnions rotatable in trunnion bearings in bearing blocks on the bucket wheel carrier,
- annular seals in said bearing blocks are adapted to prevent ingress of water to said trunnion bearings, and
- said conduit from said bleed line to said slewing sheave block bearings leads also to said trunnion bearings.

4. In combination with a dredge of the type having a bucket wheel carrier, a rotary bucket wheel supported on said carrier, a greabox, motor means connected to said gearbox for driving said rotary bucket wheel, gearbox seals disposed within said gearbox to prevent the ingress of water, and a plurality of sheave blocks mounted to said carrier, each of said sheave blocks containing at least one sheave rotatable on bearings, and seals for preventing ingress of water to the bearings, a system for pressurizing said seals for equalizing pressure on said seals from water surrounding said seals, said system comprising:
- a source of hydraulic fluid maintained at a predetermined hydraulic pressure;
- a way connecting said hydraulic fluid source to said hydraulic motor; and
- a bleed line connected to said motor and to a conduit for channeling hydraulic fluid from said motor to said gearbox and said sheave blocks;
- wherein each of said sheave blocks includes at least one sheave mounted for rotation on a shaft, a central bore formed longitudinally of said shaft, and radial bores extending from said central bore to one side of said sheave seals, said conduit being connected to said central bore such that said hydraulic fluid is channeled into said central bore, through said radial bores and against said seals under pressure to counteract the pressure of water on the opposite side of said seals.

5. The dredge as set forth in claim 4 wherein said bleed line contains a check valve means for maintaining hydraulic fluid in said conduit at a predetermined pressure.

6. The dredge as set forth in claim 4 wherein said motor and said gearbox are contained in a common housing, an annular chamber is formed around said gearbox, and a passage leads from the interior of said gearbox to said annular chamber.

* * * * *